United States Patent [19]

Savolskis et al.

[11] Patent Number: 4,551,161

[45] Date of Patent: Nov. 5, 1985

[54] ORGANIC WETTING OF GLASS BATCH

[75] Inventors: Edward P. Savolskis, North Middleton Township, Cumberland County; John F. Krumwiede, Indiana Township, Indiana County, both of Pa.

[73] Assignee: PPG Industries, Inc., Pittsburgh, Pa.

[21] Appl. No.: 624,879

[22] Filed: Jun. 27, 1984

[51] Int. Cl.$^4$ .............................. C03C 1/00; C03B 1/00

[52] U.S. Cl. .......................................... 65/27; 65/134; 65/136; 501/12; 501/27

[58] Field of Search ................ 65/27, 134, 136, 335; 501/12, 27

[56] References Cited

U.S. PATENT DOCUMENTS

| | | | |
|---|---|---|---|
| 2,975,555 | 10/1958 | Zellers, Jr. et al. | 65/27 |
| 2,976,162 | 3/1961 | Ekdahl | 106/71 |
| 3,615,811 | 10/1971 | Barrett | 106/306 |
| 3,912,534 | 10/1975 | Gurta | 65/28 X |
| 4,145,202 | 3/1979 | Grodin et al. | 65/27 X |
| 4,252,551 | 2/1981 | Nishimura | 65/28 X |
| 4,347,073 | 8/1982 | Aubourg et al. | 65/28 X |
| 4,353,725 | 10/1982 | Hohman et al. | 65/27 |

FOREIGN PATENT DOCUMENTS 1303414 1/1973 United Kingdom .

OTHER PUBLICATIONS

PCT-WIPO International Publication No. WO 82/04247, (U.S. Ser. No. 270,330), published Dec. 9, 1982.

*Primary Examiner*—Arthur Kellogg
*Attorney, Agent, or Firm*—Dennis G. Millman

[57] ABSTRACT

Energy savings are attained by employing an organic liquid such as fuel oil as a glass batch wetting agent. Also, inclusion of fuel oil in a sulfur-containing glass batch yields improved melting rates.

20 Claims, No Drawings

ORGANIC WETTING OF GLASS BATCH

BACKGROUND OF THE INVENTION

This invention relates to the melting of glass, and more particularly to improvements in formulating glass batch mixtures to be fed to a melting furnace so as to achieve better energy efficiency in the operation of the furnace.

Glass batch materials are usually fed to a glass melting furnace in a finely divided state. The finer portions of the batch can become entrained in the combustion gas stream and can be carried out of the furnace by the exhaust gas stream. Portions of this entrained dust can become deposited in the regenerator chambers or other portions of the exhaust gas passageways. Accumulations of these deposits can restrict the flows therethrough which negatively affects the efficiency with which the furnace operates and may require costly maintenance to alleviate the pluggage. For these and other reasons it is common practice in the glass industry to suppress dusting of the glass batch by wetting the glass batch prior to its being fed to the furnace. The most commonly used wetting agent is water, although sometimes caustic soda solutions are employed. Sodium silicate solutions have also been suggested as wetting agents (U.S. Pat. No. 2,975,555). The presence of water in the batch, however, is detrimental to the efficiency of the melting operation because vaporization of the water in the furnace consumes a portion of the energy being supplied to the furnace. It would be desirable to provide wetting of glass batch without incurring an energy penalty.

A sulfur source material, usually a sulfate such as salt cake ($Na_2SO_4$) or gypsum ($CaSO_4$), is conventionally included in glass batch formulas to aid in the melting and refining of the glass. Solid carbonaceous materials such as powdered coal are also sometimes included and are known to assist the action of the sulfur compounds. However, use of unnecessarily large amounts of sulfur or overly vigorous activation by carbon can be wasteful and can lead to undesirable amounts of sulfurous emissions from the melting furnace. Accordingly, the glass industry has sought more effective wasy to utilize sulfur as a glass melting aid (see, for example, U.S. Pat. Nos. 4,138,235 and 4,270,945).

SUMMARY OF THE INVENTION

In the present invention an organic liquid such as fuel oil is used to wet glass batch instead of, or in combination with, water or other aqueous solutions. By at least partially replacing water with an organic liquid that undergoes combustion when it enters the combustion zone of the furnace, the wetting agent contributes heat to the melting process in contrast to the energy consumption entailed by the vaporization of water alone. Additionally, the presence of a carbonaceous liquid appears to aid the melting process by interacting with sulfur in a sulfur-containing batch more effectively than does coal. In particular it has been observed that the early stages of the melting process are carried out more rapidly with the presence of fuel oil in the batch. Because of these advantages, the energy consumed by a furnace per unit of glass melted can be reduced by an amount that more than offsets the fuel value of the organic liquid.

DETAILED DESCRIPTION

For the purposes of the present invention virtually any combustible organic liquid could serve as the glass batch wetting agent. It would be expedient, of course, for the wetting agent to be not unduly volatile or explosive and that it not contain elements that would be contaminating to the glass product being made. The wetting agent should also be capable of undergoing exothermic combustion. A wide variety of organic liquids meet these criteria such as glycerin, sugar syrups and a large number of relatively low molecular weight polymers. But for economic reasons, commercial glass making operations will prefer the use of naturally occurring organic liquids, the most preferred type being petroleum products. Crude petroleum may be used, but fuel oil fractions of petroleum are more readily available commercially. Both the distillate fractions and the residual fractions of fuel oil are suitable, but the distillate fraction known as No. 2 fuel oil is the most commonly available fuel oil and is preferred for its ease of handling and spraying at room temperature. Heavier fractions of fuel oil such as No. 6 fuel oil ("bunker oil") may also be satisfactory but usually require heating to facilitate spraying and blending with the batch materials. Use of lighter fractions such as No. 1 fuel oil, or even kerosene, may be feasible, but their higher volatility may make them less attractive.

The amount of liquid required to prevent dusting of glass batch will vary since different glass formulas very in composition and particle size distribution. In general, the amount of liquid is sufficient to provide a significant presence of free liquid around the glass batch particles so as to create cohesiveness among the particles. In the conventional practice of wetting flat glass batch with water, the amount of water mixed with the batch may range from about 2% to about 8%, most commonly about 4%, by weight of the batch. Some of the water may hydrate with some of the batch materials and thus will not be free for wetting the batch, and therefore the amount of water added varies in accordance with the hydration state of the batch and weather conditions at the melting location.

For batch wetting purposes, fuel oil may replace approximately equal portions of water on a weight basis. It has been observed that fuel oil has slightly less wetting ability than water and, therefore, it is preferred to reduce the amount of water by slightly less than the amount of oil added. Also for this reason, it is preferred to not replace all of the water with oil, but to use both oil and water to wet the batch.

Examples 1 through 6 in Table I are typical batch formulas for clear flat glass, all of which include fuel oil in accordance with the present invention. Examples 1, 2 and 3 represent partial substitution of fuel oil for water in which the total liquid content is maintained at 4% by weight of the batch. Examples 4 and 5 are likewise based on a total liquid content of 4%, but with caustic soda solution instead of water. Total liquid content may typically vary from 2% to 8% by weight of the batch with the same ratios of fuel oil to water. If Examples 1 through 5 are to be used in place of a batch previously wetted with 4% water or caustic soda solution alone, it may be preferred to include slightly more fuel oil than shown, raising the total liquid content to about 4.25% to 5%, in order to provide the same degree of wetness.

For glass that is required to be oxidized such as flat glass, it has been found that oil in amounts greater than 3% sometimes causes excessive reduction and discoloration of the glass. Accordingly, for this type of glass the amount of fuel oil is preferably no greater than about 3% weight. For reduced, colored glass, however, this limitation need not apply.

TABLE I

| | EXAMPLES (Parts by Weight) | | | | | |
|---|---|---|---|---|---|---|
| | 1 | 2 | 3 | 4 | 5 | 6 |
| Sand | 1000 | 1000 | 1000 | 1000 | 1000 | 1000 |
| Soda Ash | 323 | 323 | 323 | 288 | 303 | 323 |
| Limestone | 84 | 84 | 84 | 84 | 84 | 84 |
| Dolomite | 242 | 242 | 242 | 130 | 130 | 242 |
| Salt Cake | 10 | 10 | 10 | 10 | 10 | 10 |
| Rouge | 0.5 | 0.5 | 0.5 | 0.5 | 0.5 | 0.5 |
| Fuel Oil (No. 2) | 4.3 | 8.5 | 33.2 | 7.6 | 30.5 | 4.3 |
| Water | 62.2 | 58 | 33.2 | — | — | 66.4 |
| Caustic Soda (50% Aqueous Solution) | — | — | — | 52.9 | 30.5 | — |
| % Fuel Oil | 0.25% | 0.5% | 2% | 0.5% | 2% | 0.25% |

Apart from the wetting function, the presence of fuel oil in the batch has been observed to aid the melting process. The energy savings attained from using batch wetted with fuel oil exceeds the savings attributable to the reduction in the amount of water in the batch. Laboratory melts show that the presence of fuel oil in the batch accelerates dissolution of batch grains during the initial portion of the melting process. This aspect of the effect of fuel oil resembles that of the powdered coal that is often included in glass batch mixtures, and therefore the fuel oil may replace the coal. But the improvements in melting performance obtained by the use of fuel oil are surprisingly greater than with the use of coal. In a glass batch containing sulfur as a refining agent (usually in the form of sulfate), it has been found that fuel oil coacts with the sulfur in a way that takes better advantage of the beneficial effects of sulfur on the melting process. Although this effect is not fully understood, it is theorized that the volatilization and combustion of fuel oil at the surface of the batch layer in the melting furnace restrict access of oxygen to the batch materials. Vapors in the vicinity of the batch not only isolate the batch from atmospheric oxygen, but also draw oxygen from the batch materials, in particular, from the sulfate, which is the most readily reducible material in the batch.

The primary purpose for the sulfate is considered to be its function as a dispersant, i.e., the sulfate tends to prevent agglomeration of sand grains which would otherwise lead to formation of silica-rich lumps and scum. The fuel oil vapors may reduce some of the sulfate to sulfide, which is known to enhance the dissolution rate of silica. This formation of sulfides appears to accelerate the overall melting process, provided that some of the sulfates remain to serve the dispersion function. An insufficient amount of salt cake or other sulfur source in the batch, or excessive reduction of sulfate to the sulfide state because of excess fuel oil or other reducing agent, has been observed to impede the overall melting rate due to sand grain agglomeration. In a typical flat glass batch, about 5 parts by weight salt cake per 1000 parts by weight sand is considered the minimum about to serve the dispersion function. Therefore, greater than 5 parts by weight of salt cake is required if a portion is to be reduced to the sulfide. For example, 10 parts by weight of salt cake may be adequate to serve both functions for most applications. For the purpose of expediting the melting rate, it is preferred to employ less than 2% by weight of fuel oil in the batch to avoid excessively reducing the sulfates when included in moderate amounts. For this aspect of the invention, the amount of water added to the batch for wetting need not be reduced from the amount normally employed without the organic wetting agent. Thus, Example 6 in Table I shows a batch formula that retains the full 4% of water that would have been used previously as the sole wetting agent, but with 0.25% fuel oil added for the sake of melting enhancement.

Another distinction between the use of coal and fuel oil in a sulfur-containing glass batch is that it has been observed that coal in amounts of about 0.5% by weight of the batch produces severe reduction and discoloration of the glass, whereas similar degrees of reduction are not produced with fuel oil until the amount of fuel oil is increased to the level of approximately 4% by weight or more.

TRIAL 1

A glass batch having the formula of Example I in TABLE I, above, having 0.5% by weight of No. 2 fuel oil along with 3.5% by weight water as the batch wetting agent was charged to a glass melting furnace at a rate of 600 tons (545 metric tons) per day. Compared to operation of the furnace at the same throughput rate with batch wetted with 4% water, it was found that the combustion of natural gas in the furnace could be reduced by approximately 6000 cubic feet per hour. The thermal energy saved by this reduction in the gas firing rate exceeded the amount of energy supplied to the furnace by the fuel oil in the batch. Additionally, the lower firing rate resulted in lower furnace structure temperatures which can yield longer furnace life. The quality of glass melted by the furnace was not affected by the trial.

TRIAL 2

In a cross-fired, six port flat glass melting furnace operating at about 600 tons (545 metric tons) per day a batch formula was used essentially as shown in Example 6 in Table 1, but with no fuel oil. The sulfur content of the exhaust gas was measured at the first three ports from the feed end of the furnace, first with no coal or other reductant in the batch, and then with 0.83 parts by weight (0.05% by weight of the batch) of powdered coal added. It was found that the amount of sulfur in the exhaust gas at the first three ports increased 10% when the coal was present in the batch. This indicates that coal accelerates release of sulfur from the batch during early stages of the melting process.

TRIAL 3

In a similar flat glass melting operation in a seven port furnace, the batch of Example 2, wetting with 0.5% fuel oil and 3.5% water, was compared with the same batch wetted with 4% water alone. It was found that the average sulfur content of the exhaust gas at the first three ports was 28% less in the case of the fuel oil and water wetted batch. Sulfur content of the product glass remained essentially unchanged, thus leading to the conclusion that the fuel oil suppressed release of sulfur in the upstream portion of the furnace and shifted the release of sulfur to a region farther downstream, which is desirable for more effective utilization of the sulfur.

TRIAL 4

In a similar glass melting furnace having seven ports and employing batch wetted with caustic soda similar to Example 4, the use of 8.2 parts by weight fuel oil as the reductant was compared to the use of 0.75 parts by weight powdered coal. Average sulfur concentration in the exhaust gas at the first three ports was found to be 35% to 37% less with the fuel oil.

Variations and modifications as known to those skilled in the art may be resorted to within the spirit and scope of the invention as defined by the claims which follow.

We claim:

1. A method of melting glass wherein finely divided glass batch materials are wetted with a liquid in sufficient amount to regard dusting of the batch and then fed while in a wetted condition to a melting furnace where the batch is heated until the batch materials become molten, the improvement comprising wetting the batch prior to being fed to the melting furnace with a wetting agent comprised of an organic liquid.

2. The method of claim 1 wherein the batch is wetted with a wetting agent additionally comprising water.

3. The method of claim 1 wherein the organic liquid is provided in an amount less than 3% by weight of the batch.

4. The method of claim 1 wherein the organic liquid is a hydrocarbon.

5. The method of claim 1 wherein the organic liquid is fuel oil.

6. The method of claim 1 wherein the wetting agent further includes an aqueous caustic soda solution.

7. The method of claim 1 wherein the wetting agent consists essentially of water and fuel oil.

8. The method of claim 7 wherein the fuel oil is provided in an amount no greater than 2% by weight of the batch.

9. The method of claim 1 wherein the wetting agent consists essentially of fuel oil and an aqueous caustic soda solution.

10. The method of claim 9 wherein the fuel oil is provided in an amount no greater than 2% by weight of the batch.

11. The method of claim 1 wherein the batch includes a sulfur-containing material.

12. The method of claim 11 wherein the sulfur-containing material comprises salt cake.

13. The method of claim 12 wherein the batch is a flat glass batch mixture.

14. A method of melting glass wherein a finely divided glass batch mixture including a sulfur source material and a carbon source material are fed to a melting furnace where the batch is heated to render it to a molten state, the improvement comprising:

providing at least a portion of the carbon source material in the batch as an organic liquid that assists in maintaining the batch mixture in a wetted condition as it is being fed to the melting furnace.

15. The method of claim 14 wherein the organic liquid is a hydrocarbon.

16. The method of claim 14 wherein the organic liquid is fuel oil.

17. The method of claim 14 wherein the sulfur source material is salt cake.

18. The method of claim 16 wherein the fuel oil is provided in an amount no greater than 2% by weight of the batch.

19. The method of claim 14 wherein the batch is a flat glass batch mixture.

20. The method of claim 14 wherein the batch is wetted with a liquid agent comprised of water and the organic liquid prior to being fed to the furnace, the liquid agent comprising 2% to 8% by weight of the batch.

* * * * *

UNITED STATES PATENT AND TRADEMARK OFFICE
CERTIFICATE OF CORRECTION

PATENT NO. : 4,551,161

DATED : November 5, 1985

INVENTOR(S) : Savolskis et al.

It is certified that error appears in the above-identified patent and that said Letters Patent is hereby corrected as shown below:

Column 5, claim 1, line 3 "regard" should read --retard--.

Signed and Sealed this

Fourth Day of March 1986

[SEAL]

Attest:

DONALD J. QUIGG

Attesting Officer   Commissioner of Patents and Trademarks